United States Patent [19]

Kollander et al.

[11] 3,930,669
[45] Jan. 6, 1976

[54] STEERABLE TRAILER SUSPENSION SYSTEM

[75] Inventors: Melvin M. Kollander, Cedar Crest, N. Mex.; Norman A. Kollander, Stillwater, Minn.; James B. Wade; Anthony Parisi, both of Albuquerque, N. Mex.

[73] Assignee: East Sandia Industrial Group, Cedar Crest, N. Mex.

[22] Filed: Nov. 12, 1974

[21] Appl. No.: 523,139

[52] U.S. Cl. .............................. 280/426
[51] Int. Cl.² ............................ B62D 13/02
[58] Field of Search ...................... 280/426

[56] References Cited
UNITED STATES PATENTS

| | | | |
|---|---|---|---|
| 2,954,239 | 9/1960 | Kollander | 280/426 |
| 2,959,428 | 11/1960 | Felburn | 280/426 |
| 3,430,985 | 3/1969 | Hildebrandt et al. | 280/426 |
| 3,448,999 | 6/1969 | Kollander et al. | 280/426 |
| 3,690,698 | 9/1972 | Humes | 280/426 |

Primary Examiner—Leo Friaglia
Attorney, Agent, or Firm—Clarence A. O'Brien; Harvey B. Jacobson

[57] ABSTRACT

A trailer suspension system eliminating jackknifing of the towing tractor and trailer assembly, providing stability to the trailer and more efficient braking especially during emergency stops and materially increasing vehicle maneuverability. Steering control is provided by a connection with the towing tractor in laterally offset relation to the vertical pivot axis formed by the kingpin and fifth wheel articulate connection between the towing tractor and trailer. The steerable wheels in the trailer suspension are supported by a generally right angular spindle structure connected to walking beam assemblies for pivotal movement about generally vertical axes which are oriented forwardly of the horizontal axis of rotation of the steerable wheels with the spindle assemblies being interconnected by parallel, vertically spaced rods provided with universal connection with the spindle assemblies for maintaining proper orientation of the steerable wheels during their steering movement and during relative vertical movement. The trailer suspension includes independently and resiliently supported axle and spindle assemblies in the form of a two axle or three axle tandem assembly with the resilient independent support for the suspension axles effectively maintaining wheel contact with the ground surface for more effective braking and greater vehicle stability.

24 Claims, 13 Drawing Figures

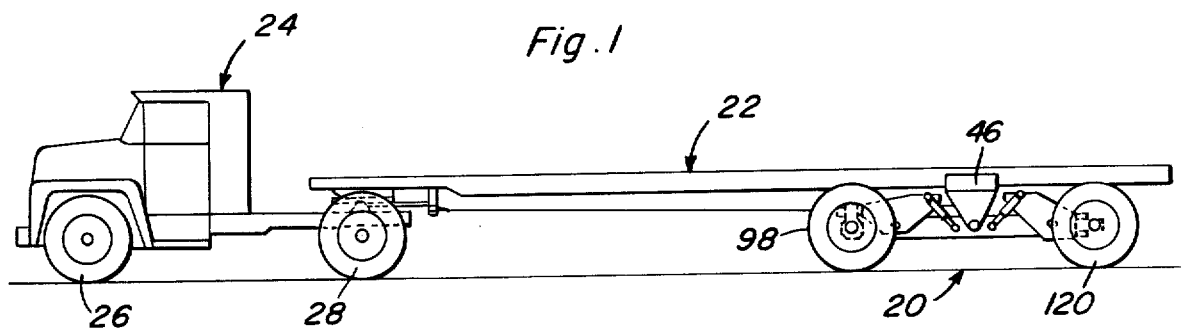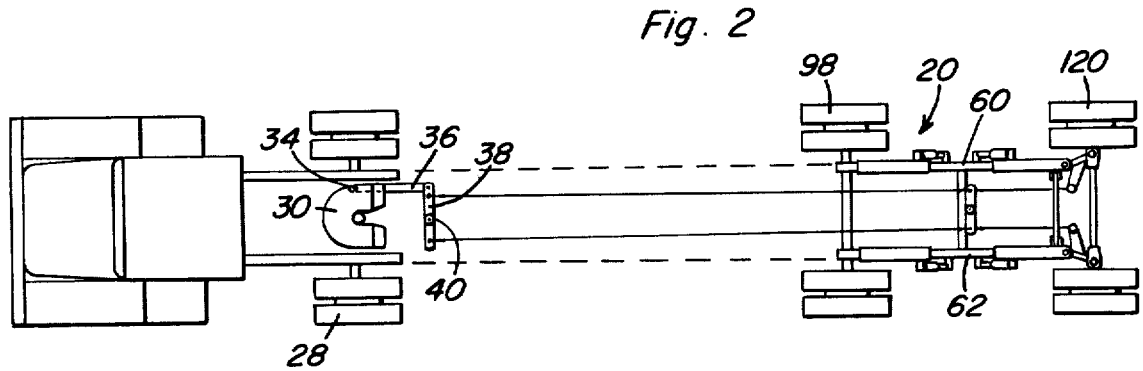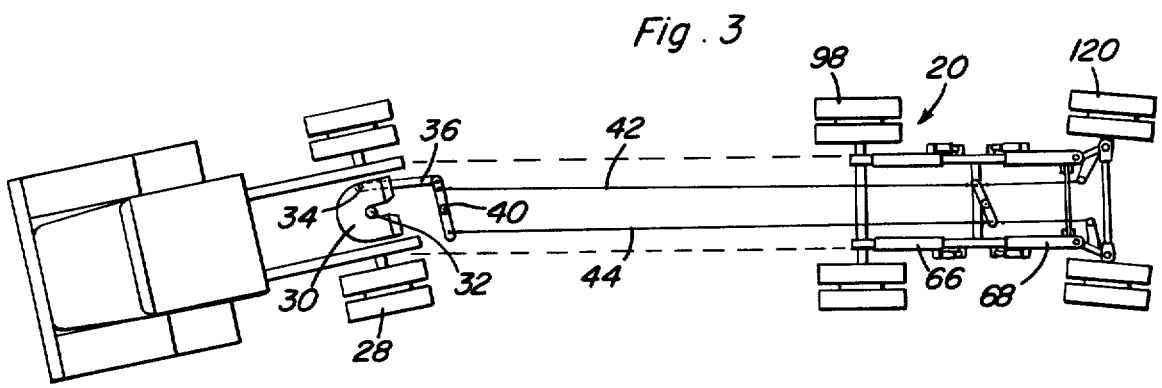

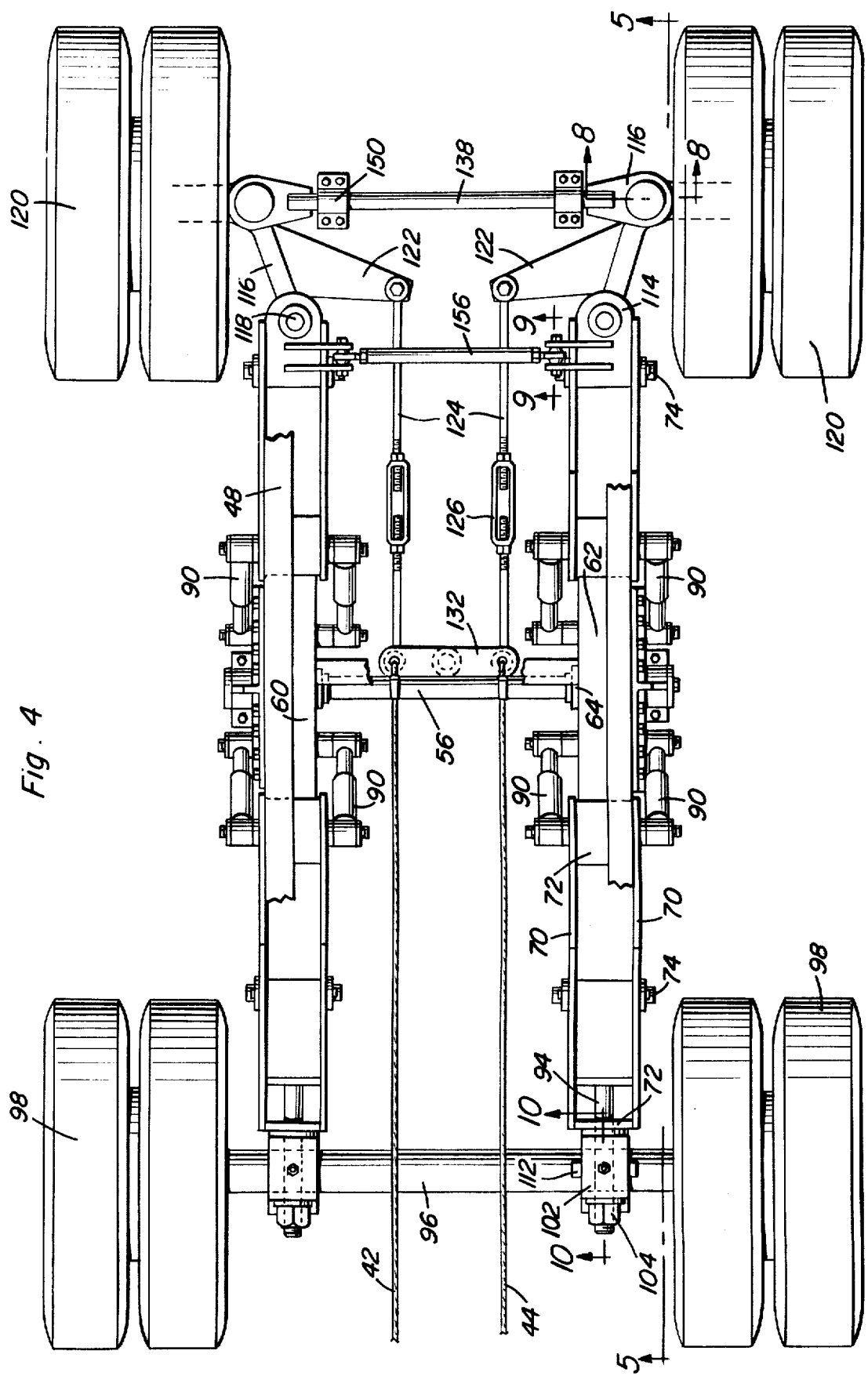

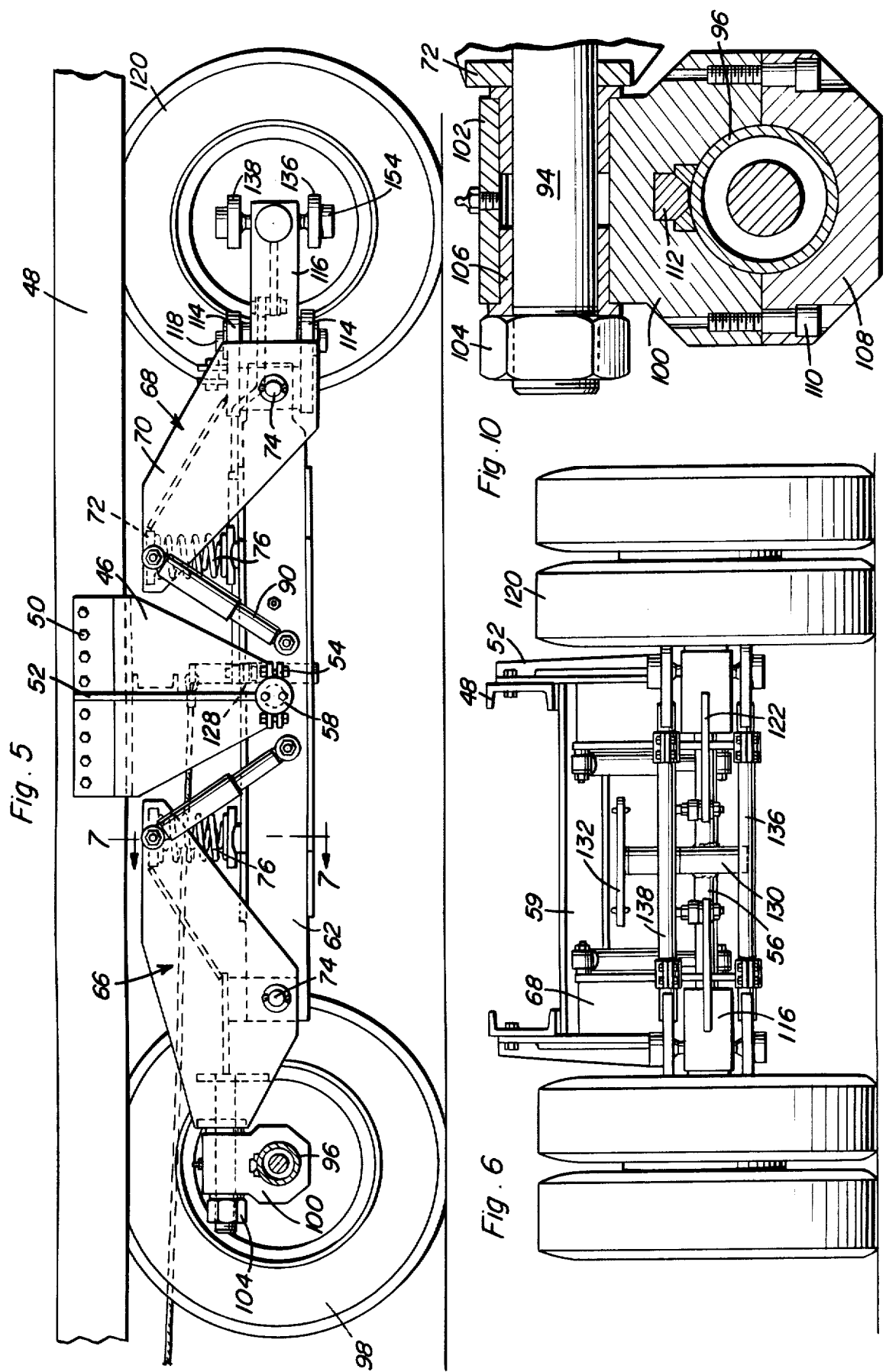

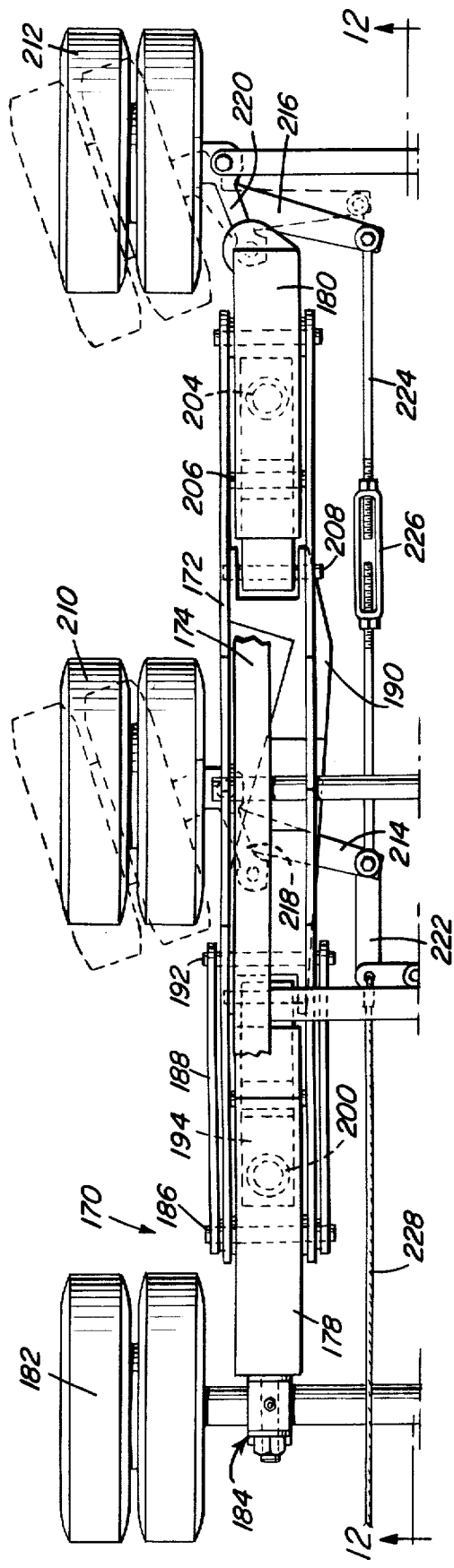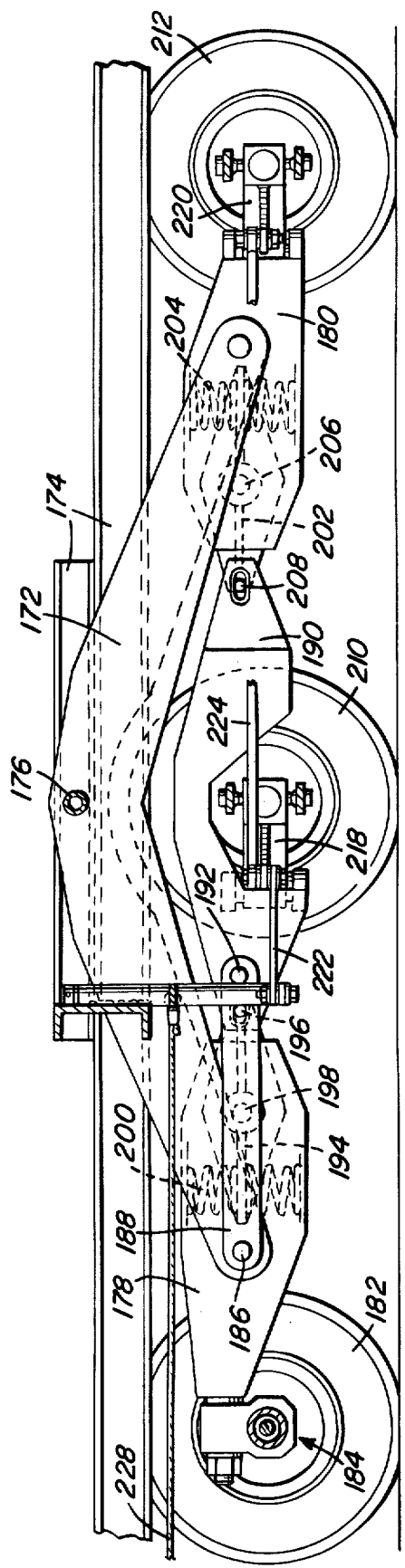

STEERABLE TRAILER SUSPENSION SYSTEM

BACKGROUND OF THE INVENTION

1. Field of the Invention

The present invention generally relates to a trailer suspension assembly of either a two axle on three axle tandem arrangement including independent resilient support and steering control of at least one set of wheels thus enabling the distance between the trailer axles to be substantially longer than normally employed in tandem wheel trailer suspension systems in order to increase maneuverability, prevent jackknifing, provide stability and more effective braking.

2. Description of the Prior Art

Kollander et al, U.S. Pat. No. 3,448,999, issued June 10, 1969 illustrates one type of trailer suspension in which steerable wheels are provided. Other U.S. patents illustrating other developments in this field of endeavor are as follows:

| | | |
|---|---|---|
| 2,333,853 | J. B. Fellabaum | Nov. 9, 1943 |
| 2,433,268 | J. P. Fellabaum | Dec. 23, 1947 |
| 2,433,269 | J. P. Fellabaum | Dec. 23, 1947 |
| 2,785,909 | R. Barnard | Mar. 19, 1957 |
| 3,195,922 | C. E. Humes | July 20, 1965 |
| 3,291,503 | M. S. DeLay | Dec. 13, 1966 |
| 3,533,644 | C. E. Humes | Oct. 13, 1970 |
| 3,689,107 | C. E. Humes | Sept. 5, 1972 |
| 3,591,203 | H. Steiner | July 6, 1971 |
| 3,690,698 | C. E. Humes | Sept. 12, 1972 |
| 3,712,641 | D. W. Sherman | Jan. 23, 1973 |
| 2,359,978 | J. S. Edwards | Oct. 10, 1944 |
| 2,662,782 | R. L. Wilson | Dec. 15, 1953 |
| 2,717,787 | J. C. Ward | Sept. 13, 1955 |
| 2,793,052 | C. L. Googe | May 21, 1957 |
| 2,954,239 | M. M. Kollander | Sept. 27, 1960 |
| 2,968,495 | C. T. Hutchens | Jan. 17, 1961 |
| 3,102,735 | H. W. Bigge | Sept. 3, 1963 |

While such devices have advanced the performance of tractor-trailer vehicle assemblies, there is substantial need for improvements in anti-jackknifing capabilities, vehicle maneuverability capabilities and braking capabilities of such vehicles.

SUMMARY OF THE INVENTION

An object of the present invention is to provide a trailer suspension system of the two axle or three axle tandem type in which the span between the axles is greater than usually provided between adjacent axles in tandem axle suspensions inasmuch as the wheels on all but one axle are steerable under control of the angular relationship between the towing tractor and trailer about a vertical axis defined by the kingpin and fifth wheel connection thereby not only reducing tire wear but increasing vehicle maneuverability and eliminating jackknifing.

Another object of the invention is to provide a trailer suspension assembly in which the axles are independently and resiliently supported from elongated walking beams to provide effective and continuous contact between the wheels and ground surface during movement of the trailer and during emergency stops thereby increasing the braking efficiency of the vehicle.

A further object of the invention is to provide a trailer suspension system in which the steerable wheels are interconnected by two parallel, vertically spaced bars having ball joints at each end with the steerable wheels being supported by a generally L-shaped spindle assembly interconnected by the two bars with the spindle assemblies being supported from the walking beams for pivotal movement about a vertical axis at the forward end of each spindle assembly with the vertical axis being disposed forwardly of the horizontal rotational axis of the wheels supported by the spindle assemblies.

Still another object of the invention is to provide a trailer suspension assembly in accordance with the preceding objects in which each independent resilient support for the axles includes two or more springs in the form of concentric coil springs having different resilient characteristics so that the lighter of the springs will support the unloaded trailer and as the trailer loading increases additional springs are used to support the load thus maintaining a more constant spring rate-to-load ratio and a more natural constant frequency thereby reducing the tendency of the wheel to hop or leave the road when driven over uneven roads or braked.

Still another object of the invention is to provide a trailer suspension assembly in which steering control of the steerable wheels is effective in both a forward and rearward direction and is effective to orient the path of movement of the trailer more closely to the path of movement of the towing tractor when negotiating a curve to substantially reduce or eliminate lateral thrust or angular thrust of the trailer kingpin on the tractor fifth wheel thereby reducing or eliminating jackknifing of the tractor and trailer.

Still another feature of the invention is to provide a trailer suspension assembly which is relatively simple and economical in construction, easy to maintain and repair and enables heavier payloads to be transported due to the longer span between the axles.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic side elevational view of a tractor-trailer vehicle with the steerable suspension assembly incorporated therein.

FIG. 2 is a plan view of the construction of FIG. 1 with the trailer platform removed illustrating the components in a straight line condition.

FIG. 3 is a plan view similar to FIG. 2 but with the tractor and trailer oriented in angular relation and the steerable wheels of the trailer being steered so that the trailer will more nearly follow the path of the tractor.

FIG. 4 is a top plan view of the two axle tandem suspension assembly of the present invention.

FIG. 5 is a side elevational view taken substantially upon section line 5—5 of FIG. 4, with portions shown in section, illustrating the structure of the walking beams and independent spring suspension assembly for the forward axle and rear steerable wheels.

FIG. 6 is a rear elevational view of the tandem axle suspension assembly of FIG. 4 illustrating the connecting bars between the steerable wheels, the spindle assemblies therefor and the steering control therefor.

FIG. 10 is a detailed sectional view taken along section line 10—10 of FIG. 4, on an enlarged scale, illustrating the connection between the forward axle suspension assembly and the forward axle.

FIG. 11 is a plan view of one side of a three axle suspension assembly in which the two rear wheel assemblies are steerable.

FIG. 12 is a side elevational view of the construction of FIG. 11 taken generally along section line 12—12 of FIG. 11 illustrating the structural association of the three axle suspension assembly.

DESCRIPTION OF THE PREFERRED EMBODIMENTS

Figure 7:
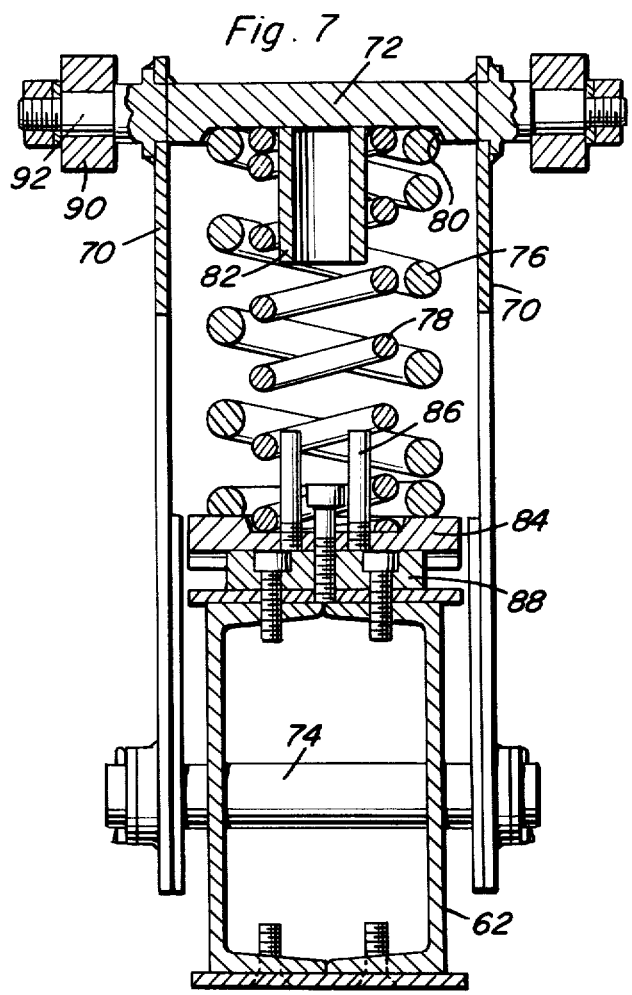
FIG. 7 is a vertical, sectional view, taken substantially upon a plane passing along section line 7—7 of FIG. 5, on an enlarged scale, illustrating the concentrically arranged multiple stage coil springs.

Referring now specifically to the drawings, the steerable trailer suspension assembly of the present invention of the two axle tandem type is generally designated by numeral 20 and can be installed on any suitable type of trailer 22 towed by a towing tractor vehicle 24 provided with the usual front steerable wheels 26, rear driving wheels 28 and a fifth wheel 30 which coacts with a kingpin 32 on the trailer 22 to provide an articulate connection between the tractor 24 and trailer 22 for relative movement about a substantially vertical axis. The structure of the tractor vehicle 24 is conventional except for a connecting point 34 for a control link 36 which extends rearwardly and is connected to a steering bar 38 that is pivotally supported from the trailer for pivotal movement about a pivot pin 40 so that the steering bar 38 remains parallel to the horizontal axis of rotation of the driving wheels 28 on the tractor vehicle 24. The specific structural details of the steering bar 38, the mounting structure 40 therefor, the link 36 and its connection to the fifth wheel at point 34 is schematically illustrated and may be of any suitable structural arrangement with any suitable detachable connection being provided and also adjustments being provided for enabling the trailer to be connected to various vehicles and to enable the linkage to be adjusted depending upon the dimensional characteristics of each individual installation. Extending rearwardly from and connected to the outer end portions of the steering bar 38 is a pair of steering rods or cables 42 and 44 which are oriented under the platform of the trailer between the usual frame rails and the like with the cables 42 and 44 being provided with turnbuckle adjustments and also provided with guide rollers, pulleys or the like if deemed necessary.

The tandem suspension assembly 20 includes depending generally triangular supporting brackets 46 connected to the longitudinal frame rails 48 of the trailer 22 by suitable fastening means such as bolts or the like 50. The brackets 46 have an external reinforcing gusset 52 thereon and at the bottom, each bracket is provided with a split clamp plate assembly 54 for anchoring a transverse shaft or rod 56 thereto with end caps 58 retaining the transverse shaft 56 in position. The brackets 46 are interconnected by a transverse beam 59 spaced above the shaft 56 thus forming a rigid support structure for the transverse shaft 56 which may be a solid or a hollow member and which forms the main support for the suspension assembly which is spaced vertically below the frame rails 48.

Supported on the transverse shaft 56 is a pair of elongated hollow walking beams 60 and 62 which may be in the form of hollow beams or two channel shaped members secured together in facing relation with the hollow beams extending both forwardly and rearwardly in parallel spaced relation for substantially equal distances from the shaft 56 with the beams being substantially rigid but including some degree of resiliency and being mounted on the shaft 56 for relative pivotal movement with collars 64 retaining the beams against the brackets 46.

Mounted on the front of each of the beams 60 and 62 is a front spring rocker 66 and mounted at the rear of each beam is a rear spring rocker 68 with the rockers being of various configurations and oriented externally as shown or partially interiorly of the hollow beams. The front spring rocker 66 is in the form of a hollow member defined by side plates 70 interconnected by a plurality of horizontal and vertical reinforcing plates 72 which form a rigid structure pivotally supported from the end of the beam by a transverse pivot pin 74 having removable retaining means on each end thereof so that the spring rocker 66 straddles the end of the beam and can pivot about a transverse horizontal axis defined by the pin 74. The reinforcing plate 72 at the rear upper end of the spring rocker 66 forms a seat for a pair of concentrically arranged coil springs 76 and 78 which extend between the plate 72 and the top surface of the beam 60 or 62. The plate 72 is provided with a spring seat 80 receiving the upper ends of the springs and a depending projection 82 is provided which extends into the interior of the center spring 78 for a short distance. The top surface of the beam 62 in FIG. 7 and also the beam 60 is provided with a spring seat assembly consisting of a spring seat 84 which mates with the upper surface of block 88 forming a cylindrical contact arc and upstanding guides 86, which enables some degree of rocking movement of the spring seat 84 to permit angulation of the spring due to its engagement with the plate 72 which angulates during arcuate movement with the rocker 66 so that the line of force will be along the longitudinal axis of the springs thus retaining the springs in a substantially straight line condition even though the upper ends of the springs may move slightly in an arcuate path. A conventional shock absorber assembly 90 interconnects the beam 62 and the rocker 66 with the point of attachment of the shock absorber 90 being a projection from the plate 72 as at point 92 as illustrated in FIG. 7 and as illustrated, shock absorber assemblies 90 are provided on each side of each of the rockers 66.

The forward end of the rocker 66 is provided with a projecting shaft or rod 94 that is rigidly fixed between the plates 70 by vertical plates 72 as illustrated in FIG. 10. The shafts or rods 94 projecting from the forward spring rockers 66 support the forward axle or axle housing 96 which has wheel assemblies 98 on each end thereof with an axle clamp 100 having a longitudinal sleeve 102 on the upper end thereof receiving the shaft 94 which is retained therein by a retaining nut 104 and provided with suitable bearings or bushings 106 which may be of resilient material to enable some degree of relative movement between the rod 94 and the sleeve 102 in addition to relative rotational movement. The axle clamp 100 is provided with a removable cap 108 retained in place by bolts 110 or other suitable fasteners and the clamp 100 on one of the forward spring rockers is provided with a keyed connection 112 with the axle housing 96 so that it is rigid therewith which is necessary to transmit torque from the wheel assemblies 98 and the axle housing 96 which occurs during a braking action exerted by the wheels 98. As illustrated in FIGS. 4 and 10, the keyed connection 112 is only at the left spring rocker and not at the right with it being pointed out that this orientation could be interchanged. Also, other means, such as a crank link and a connection rod, could be used to transmit braking torque to a point on the rocker. Thus, one of the wheel assemblies 98 may move vertically in relation to the other since the unkeyed connection will permit relative rotation between the axle housing 96 and the axle clamp along the axis of the axle housing 96. With this construction, the front wheel assemblies 98 and the axle assembly 96 are spring supported from the beams 60 and 62 and relative elevational movement of the wheel assemblies 98 may occur by the pivotal and resilient bearings or bushings between the axle clamps and the shafts 94 and the rotational connection between one of the axle clamps and the axle housing. The spring assemblies are multi-stage inasmuch as the lightweight inner spring 78 will support the trailer when empty thus retaining the wheels on the ground and reducing the tendency of the trailer to bounce excessively when unloaded which occurs when only heavy duty springs are employed. When the trailer is fully unloaded, the outer heavy springs 76 will be spaced from the upper seat whereby it will not become effective until at least a partial load has been introduced onto the trailer. Other various arrangements may be provided for providing a multi-stage spring support effect where under conditions of no load, the resiliency of the spring support iss such that the trailer will be supported and the wheels retained in contact with the ground surface and when a load is applied to the trailer, the heavier duty spring will come into play for adequate support of the trailer load and for maintaining the wheels in contact with the ground surface. The shock absorber assemblies 90 perform their usual function of cushioning and retarding relative pivotal movement between the spring rockers and beams.

The rear spring rockers 68 are similar to the front rockers 66 insofar as their connection with the beams is concerned with the same reference numerals being applied to corresponding structural components including the side plates 70, reinforcing plates 72, pivot shaft 74, spring assemblies 76 and 78 and the shock absorber assembly 90. However, the rear end portion of the rear spring rockers 68 is constructed differently from the forward portion of the spring rockers 66 in that a pair of vertically spaced plates 114 are welded between the side plates 70 and project rearwardly therefrom in substantially horizontal parallel relation.

Pivoted between the rear end portions of the plates 114 on each of the rear spring rockers 68 is an angulated caster axle or spindle assembly 116 which has its forward end pivotally mounted on a retaining pin or bolt 118 extending vertically through the plates 114 thus forming parallel vertical axes for swinging movement of the spindle assemblies 116. The spindle assembly includes two angulated arm portions with the included angle therebetween being slightly greater than 90 degrees and with the rear arm portion including a spindle which rotatably receives the wheel assemblies 120. As illustrated, the rotational axis of the wheel assemblies 120 is disposed rearwardly of the vertical axes of rotation or angular movement of the spindle assemblies 116 defined by the vertical pivot pin or bolt 118 which connects the forwardly extending arm portion of the spindle assembly 116 to the rear rocker 68 with this structure being duplicated at each side of the suspension assembly. The spindle assembly is of unitary construction and includes the usual bearing and mounting assembly for the wheel assemblies 120 to enable rotational support of the wheel assemblies 120.

For controlling the pivotal or swinging movement of the spindle assemblies about the pivot pins or bolts 118, each of the spindle assemblies 116 includes an inwardly extending steering arm 122 rigid with the forward portion of the spindle assembly 116 as illustrated in FIG. 4. The inner end of each of the steering arms 112 is connected to a steering rod 124 having a turnbuckle adjustment 126 incorporated therein and which extends forwardly for connection with a steering bar 128 on the lower end of a vertically disposed shaft journaled in a sleeve 130 carried by the transverse shaft 56. The vertical shaft is provided with a similar steering bar 132 on its upper end to which the steering cables 42 and 44 are connected as illustrated in FIG. 4. Thus, movement of the steering cables or rods 42 and 44 is transmitted to the steering arms 122 through the steering bar 132, vertical shaft rigid therewith and rigid with the lower steering bar 128 which has its ends connected to the steering rods 124. The vertical steering shaft may be provided with a shear pin connection to either of the steering bars to protect the mechanism from damage due to excessive forces. The turnbuckle 126 or any other suitable adjustment mechanism may be provided for assuring accurate adjustment and positioning of the wheel assemblies 120 in relation to bar 38 to maintain the proper rotational orientation of the wheel assemblies.

Figure 8:
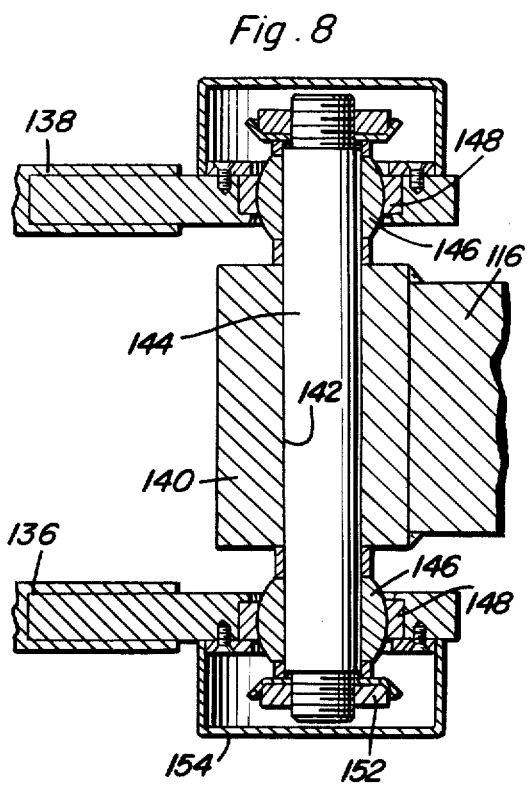
FIG. 8 is a vertical, sectional view taken substantially upon a plane passing along section line 8—8 of FIG. 4, on an enlarged scale, illustrating the ball joint connection between the parallel bars interconnecting the spindle assemblies for the steerable wheels.
Figure 9:
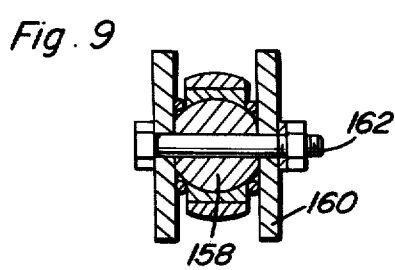
FIG. 9 is a detailed sectional view taken substantially upon a plane passing along section line 9—9 of FIG. 4, on an enlarged scale, illustrating the stabilizing connection between the independent suspension members for the steerable wheels.

To provide a transversely extending axle between the rear wheel assemblies 120, and to maintain the vertical planes of the wheel assemblies 120, a pair of transversely extending, vertically spaced, parallel bars 136 and 138 are provided between the spindle assemblies at the juncture between the forwardly extending arm portion and the spindle forming portion of the spindle assembly with the bars 136 and 138 being generally in alignment with the rotational axis of the wheel assemblies 120. The juncture portion 140 of the spindle assembly as illustrated in FIG. 8 is provided with a vertical bore 142 receiving a bolt or pin 144 therethrough which has a partial ball member 146 adjacent each end thereof. Each end of each of the bars 136 and 138 is provided with a partially spherical socket 148 therein receiving and being mounted on the ball member 146 thus forming a ball joint connection between the upper and lower ends of the bolt 144 and the ends of the bars 136 and 138 respectively which, in effect, provides a parallelogram linkage so that the vertical planes of the wheel assemblies 120 will be maintained even though one wheel assembly 120 may move vertically in relation to the other. The bars 136 and 138 may have adjustment clamps or other structural features 150 to enable adjustment thereof for accurate positioning of the wheel assemblies and the bolt 144 is provided with retaining nuts 152 and various bearings and bushings and a cover cap 154 to seal the universal connection between the bars 136 and 138 and the spindle assembly 116. As illustrated in FIG. 3, when the tractor 24 is angulated in relation to the trailer 22, the rearmost wheel assemblies 120 are angulated so that the rotational axis of the driving wheels 28 of the tractor and the rotational axes of the steerable wheel assemblies 120 intersect whereby the trailer 22 will follow more closely the path of movement of the tractor with the trailer, in effect, pivoting about an axis defined by the contact between the front wheel assemblies 98 and the ground surface.

Interconnecting the rear ends of the rear rockers 68 is a stabilizing bar 156 having a universal ball joint connection 158 with a pair of lugs 160 and a connecting bolt 162 secured to the uppermost of each of the plates 114 as illustrated in FIG. 4. This bar stabilizes the rear rockers 68 during relative vertical movement between the wheel assemblies 120 which movement is permitted by virtue of the pivotal connections being provided with bearings to enable the degree of movement required to enable relative vertical movement of the steerable wheel assemblies 120 and still maintain the vertical planes of the wheel assemblies 120 and the rotational axes of the wheels 120 and the pivotal axes defined by the bolts 118 to be maintained in a vertical orientation.

FIGS. 11 and 12 illustrate a three axle suspension assembly embodying the principles of the present invention and which is generally designated by numeral 170. In this arrangement, the front axle and wheel assemblies are substantially the same as in the embodiment of the invention illustrated in FIGS. 1–10 and each of the two rear axle assemblies are substantially the same as the rear axle assembly illustrated in FIGS. 1-10 with certain modifications thereof. In this construction, an elongated and upwardly bowed walking beam 172 is supported from the longitudinal rails 174 of the trailer by a transverse shaft or axle 176 with the forward end of the beams 172 supporting front spring rockers 178 and the rear of the beams supporting rear spring rockers 180. The forward spring rocker 178 supports front wheel assemblies 182 with the same type of connection as employed in the embodiment illustrated in FIGS. 1–10 and which is generally designated by numeral 184. The pivotal connection between the front rocker 178 and the beam 172 is in the form of a horizontal bolt or pin 186. Connected to the outer ends of the pin or bolt 186 is a pair of bars or straps 188 which extend rearwardly and are connected to the forward end of an intermediate rocker 190 by a transverse pin or bolt 192. The intermediate rocker 190 has its forward end connected with a rocker plate 194 through a lost motion connection 196 with the rocker plate 194 being pivotally connected to the forward rocker 178 by a pivot bolt or pin 198. The forward end of the rocker plate 194 is received between a pair of opposed coil springs 200 extending between the forward end of the rocker plate 194 and the top and bottom of the forward rocker 178 respectively thus resiliently supporting the front rocker 178 and front wheels 182 and resiliently supporting the intermediate rocker 190 between the forward rocker 198 and rear rocker 180 with the rear end of the intermediate rocker 190 being connected to the forward end of the rear rocker 180 by a similar type of rocker plate 202 which extends between a pair of coil springs 204 and has a pivotal connection to the rear rocker 180 at 206 and a lost motion connection 208 with the rear of the intermediate rocker 190 as illustrated in FIG. 12.

The intermediate rocker 190 has a pair of wheel assemblies 210 mounted thereon and the rear rocker assembly 180 has a pair of wheel assemblies 212 mounted thereon with the supporting structure for these wheel assemblies being the same as the rear wheel assemblies 120 in FIGS. 1 to 10, that is, there is provided a spindle assembly and interconnecting parallel bars as well as steering arms 214 and 216 connected to the spindle assemblies 218 and 220 respectively. The inner ends of the steering arms 214 and 216 are connected to steering rods or bars 222 and 224 with suitable adjustable turnbuckles incorporated therein as at 226 with the steering structure being controlled by the steering cables or rods 228 similar to the cables or rods 42 and 44. The structure illustrated in FIGS. 11 and 12 is duplicated on each side of the vehicle about a center line with the structure being symmetrical on both sides of the center line of the three wheel tandem arrangement. Shock absorbers, multiple stage springs, lubrication fittings and the like are provided where necessary in the three tandem wheel assembly and, if desired, the arrangement of the steerable wheels may be varied, that is, they may be at the front and rear with the stationary wheels insofar as steering is concerned being oriented centrally of the suspension assembly as desired.

Figure 13:
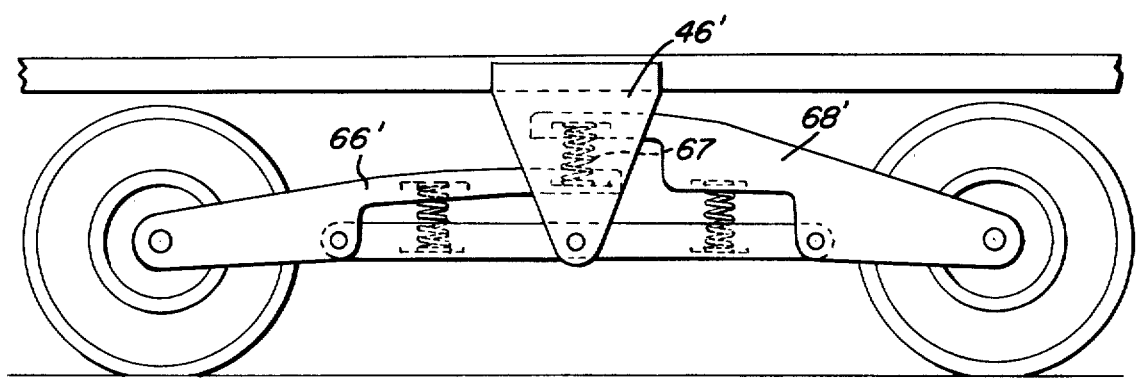
FIG. 13 is a schematic side elevational view illustrating another embodiment of the invention in which the adjacent ends of the independent suspension assemblies overlap and are resiliently spaced from each other.

FIG. 13 illustrates schematically another form of the invention similar to that illustrated in FIGS. 1–10 except that in this arrangement, the forward rockers 66' and the rear rockers 68' extend into overlapping relation to each other adjacent the bracket 46' with a spring assembly 67 disposed therebetween with the structural association being schematically illustrated without regard to the specific details of the connection between the beams, rockers and wheel assemblies.

In this arrangement, torque exerted on the wheels during braking action will cause the overlapping ends of the rockers 66' and 68' to move toward each other so that such torque will be cushioned by the spring 67 so that the torque from the brake application on the front wheels and on the rear wheels will counteract each other.

Standard components such as brake mechanism and brake actuating mechanisms have not been included since they are of conventional construction and operate in a conventional manner. This is also true of wheel bearings, various lubrication and seal structures and other conventional components.

By spreading the axles apart, on the order of 8 or 9 feet or more space between the axles, the load which can be freely carried in many states can be increased. The steerable wheels enable the trailer to follow substantially in the tracks of the tractor which materially enhances maneuverability, stability and reduction in tire wear and effectively reduces lateral forces on the kingpin during steering corrections and turns thereby reducing the tendency of the tractor-trailer assembly to jackknife. The suspension system materially reduces stopping distances by maintaining the wheels in contact with the roadway. During high speed braking, the vehicle has been maintained in a single lane with the braking distances being substantially less than those required by various regulatory agencies.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A steerable trailer suspension system comprising a tandem axle assembly including a pair of longitudinally extending supporting beams, front resiliently supported rocker assemblies on the beams supporting forward wheel assemblies, rear resiliently supported rocker assemblies on the beams supporting rear wheel assemblies, spindle assemblies on one pair of rocker assemblies supporting the wheel assemblies therefrom for swinging movement about substantially vertical axes spaced forwardly of the rotational axes of the wheel assemblies supported from the spindle assemblies, and steering control means connected to the spindle assemblies for controlling the orientation of the steerable wheel assemblies.

2. The structure as defined in claim 1 wherein the spindle assemblies each is of angulated configuration and including a spindle rotatably supporting a wheel assembly, an axle assembly in the form of spaced bars interconnecting the spindle assemblies and forming a parallelogram linkage to maintain the steerable wheels in a vertical plane, said bars being connected to the spindle assemblies by a ball joint connection to enable independent vertical elevation of the spindle assemblies and steerable wheels carried thereby.

3. The structure as defined in claim 2 wherein the spindle assemblies are connected to the rear rocker assemblies, said steering control means including a laterally extending steering arm connected to each spindle assembly.

4. The structure as defined in claim 1 wherein each rocker assembly is pivotally supported from an end portion of the beam, and spring means interposed between the beam and rocker for spring supporting the rocker.

5. The structure as defined in claim 4 wherein said beam is substantially straight with the forward rocker assemblies supporting a nonsteerable axle having wheel assemblies on each end thereof.

6. The structure as defined in claim 1 wherein said beam is angulated with an elevated central portion with three rocker assemblies being connected to the beam and to each other supporting three axle and wheel assemblies with at least two of the wheel assemblies being steerable.

7. In combination with a towing tractor and trailer interconnected by a fifth wheel and kingpin, a tandem axle suspension assembly including steerable wheels, control means interconnecting the steerable wheels and a steering arm maintained generally parallel to the rotational axis of the drive wheels on the tractor to steer the steerable wheels generally in the direction for moving the trailer in substantially the same path as the tractor, said steerable wheels each including a spindle assembly of angulated configuration and provided with a vertical pivotal connection to the trailer for pivoting the steerable wheels about vertical axes spaced longitudinally from the rotational axes of the steerable wheels in response to articulate movement of the tractor and trailer about the kingpin.

8. The combination as defined in claim 7 wherein said spindle assemblies are interconnected by parallel bars having universal connection with the spindle assemblies to retain the spindle assemblies in predetermined orientation during change in elevational relationship between the spindle assemblies and wheel assemblies mounted thereon.

9. The combination as defined in claim 8 in which the spindle assemblies are mounted rearwardly of a nonsteerable axle on a two axle tandem axle suspension system.

10. The combination as defined in claim 8 wherein the trailer includes a three axle tandem axle suspension assembly with two of the axles including spindle assemblies being steerably controlled and one of the axles including non-steerable wheels.

11. A trailer suspension system comprising a first set of wheels disposed in supporting relation to a trailer, a second set of wheels oriented in rearwardly spaced relation to the first set of wheels and disposed in supporting relation to a trailer, longitudinally extending beam means in supporting engagement with the trailer, and means interconnecting said beam means and said sets of wheels to retain the wheels in supporting relation to the beam means, said interconnecting means including a spring rocker assembly for each set of wheels, each spring rocker assembly including a pair of laterally spaced rocker members pivotally connected to the beam means for pivotal movement about a transverse axis, spring means interconnecting each of said rocker members and said beam means and associated with the transverse pivot axes to independently bias said rocker members about its transverse axis to bias the wheels downwardly thereby supporting the trailer resiliently from the wheels.

12. The combination of claim 11 wherein one set of said wheels are interconnected by an axle assembly, means interconnecting the axle assembly, and two of said rocker members to transmit braking torque from the wheels to the beam means while permitting the wheels in said set to move vertically in relation to each other.

13. The combination of claim 12 wherein said axle assembly is rigid and rotatably supports the wheels in said one set in parallel non-steerable condition.

14. The combination of claim 12 wherein said axle assembly includes a pair of parallel, vertically spaced bars, a spindle assembly at each end of the axle assembly, ball joint means connecting the ends of the bars to the spindle assemblies, said wheels being rotatably mounted on the respective spindle assemblies for rotation about a generally transverse axis with the bars enabling vertical movement of the wheels while maintaining them in a vertical plane.

15. The combination of claim 14 wherein each of said spindle assemblies includes an offset portion extending longitudinally of the trailer in relation to the rotational axis of the wheel mounted thereon, means pivotally supporting the offset portion of each spindle assembly to its respective rocker member for pivotal movement about a vertical axis spaced longitudinally from the rotational axis of the wheels whereby the wheels may swing laterally of the trailer and move vertically relative to each other with the bars maintaining the wheels in a vertical plane, and steering control means connected to each of said offset portions of the spindle assemblies for swinging said wheels and maintaining their axes of rotation in generally parallel relation and providing steering control for the trailer to enable the span between the first and second set of wheels to be increased.

16. The combination of claim 15 wherein said trailer is connected to a towing tractor by a kingpin and fifth wheel assembly enabling relative angular movement about a generally vertical axis, said steering control means including means operatively connected to the tractor in offset relation to the kingpin for controlling the steerable swingable wheels in response to angular relationship of the tractor and trailer for steering the trailer to substantially follow the path of the tractor thereby reducing lateral forces exerted on the kingpin thereby reducing the possibility of the tractor and trailer jackknifing.

17. The combination of claim 16 wherein said axle assembly is located rearwardly of the beam means, the other set of wheels being disposed forwardly of the beam means and being interconnected at a rigid axle assembly rotatably supporting the wheels on the outer ends thereof in non-steerable condition, means interconnecting said rigid axle assembly and two of said rocker members to transmit braking torque from the forward wheels to the beam means while permitting the front wheels to change elevation in relation to each other.

18. The combination of claim 17 wherein said means connecting the offset portions of the spindle assemblies to the rocker members includes a vertical pivot member for transmitting braking torque from the rear wheels to the beam means.

19. The combination of claim 18 wherein said torque transmitting means connected to the rigid axle assembly includes clamps connected to the rigid axle, and a longitudinally extending shaft rigid with each rocker member and swivelly connected with each clamp to permit relative movement about longitudinal axes spaced laterally of each other, one of said clamps being mounted for pivotal movement about the axis of the rigid axle assembly, the other clamp being ridigly keyed to the rigid axle assembly to transmit torque from the front wheels to the beam means.

20. The combination of claim 19 wherein the rocker members have overlapping end portions remote from the wheels, and spring means associated with the overlapping ends of the rocker members to cushion relative movement therebetween, said overlapping ends being arranged whereby the braking torque from the front and rear wheels will counteract each other thus maintaining wheel contact with the ground surface during emergency stops and thereby preventing wheel hop and providing a straight line braking path when the wheels skid.

21. The combination of claim 17 together with a third set of wheels oriented rearwardly of the second set of wheels and being interconnected by an axle assembly, said third set of wheels and axle assembly being duplicative of the steerable wheels and being controlled by said steering control means for following the path of the second set of wheels whereby the trailer will pivot about the line of contact between the front set of wheels and the ground surface.

22. The combination of claim 21 wherein said steering control means includes a pair of longitudinal tension members disposed below the trailer and being adjustable in length to accurately orient the steerable wheels, said beam means being centrally pivotally connected to the trailer.

23. The combination of claim 11 wherein each of said spring means includes multiple concentric coil springs having seat means forming an arcuate contact surface which enables angulation of the springs so that the line of force on the springs will be along the longitudinal axis to retain them in straight condition.

24. The combination of claim 23 wherein each of the multiple coil springs includes two or more springs having different resilient characteristics whereby the lighter of the springs will support the unloaded trailer and as the trailer loading increases, additional springs are used to support the load thus maintaining a more constant spring rate-to-load ratio and a more natural constant frequency thereby reducing the tendency of the wheel to hop or leave the road when driven over uneven roads or braked.

* * * * *